United States Patent
Wolniak

[11] Patent Number: 5,542,465
[45] Date of Patent: Aug. 6, 1996

[54] DIE SPACE ACCESS SYSTEM FOR TIE-BAR STYLE DIE-CASTING MACHINES

[76] Inventor: Robert T. Wolniak, State Highway 64 West, Rte. 2, Box 221, Cornell, Wis. 54732

[21] Appl. No.: 337,762

[22] Filed: Nov. 10, 1994

[51] Int. Cl.⁶ .................... B22D 11/12; B22D 17/04
[52] U.S. Cl. ............................ 164/341; 164/312
[58] Field of Search ................. 164/312, 342, 164/341, 137

[56] References Cited

U.S. PATENT DOCUMENTS

| | | | |
|---|---|---|---|
| 4,716,952 | 1/1988 | Hegel et al. | 164/312 |
| 5,161,594 | 11/1992 | Bolton et al. | 164/312 |
| 5,379,827 | 1/1995 | Perrella et al. | 164/342 |

FOREIGN PATENT DOCUMENTS

| | | | |
|---|---|---|---|
| 310807 | 4/1989 | European Pat. Off. | 164/342 |
| 64-2773 | 1/1989 | Japan | 164/341 |
| 64-36425 | 2/1989 | Japan | 164/312 |

*Primary Examiner*—P. Austin Bradley
*Assistant Examiner*—I.-H. Lin
*Attorney, Agent, or Firm*—Joel D. Skinner, Jr.

[57] ABSTRACT

A die space access system for tie bar style die casting machines. The system provides improved access to the die space of tie bar style die casting machines for installation and removal of dies by permitting a tie bar to be withdrawn horizontally with respect to the machine, thus creating an unobstructed access window to the die space. The system comprises a vertically movable spit clamp with an interiorly grooved circular bore. The bore mates with the grooves on the exterior of the tie bar. The system further comprises a frame fastened to the outside surface of the shot platen of the die casting machine. The frame has pairs of first and second hydraulic cylinders which control the split clamp.

14 Claims, 8 Drawing Sheets

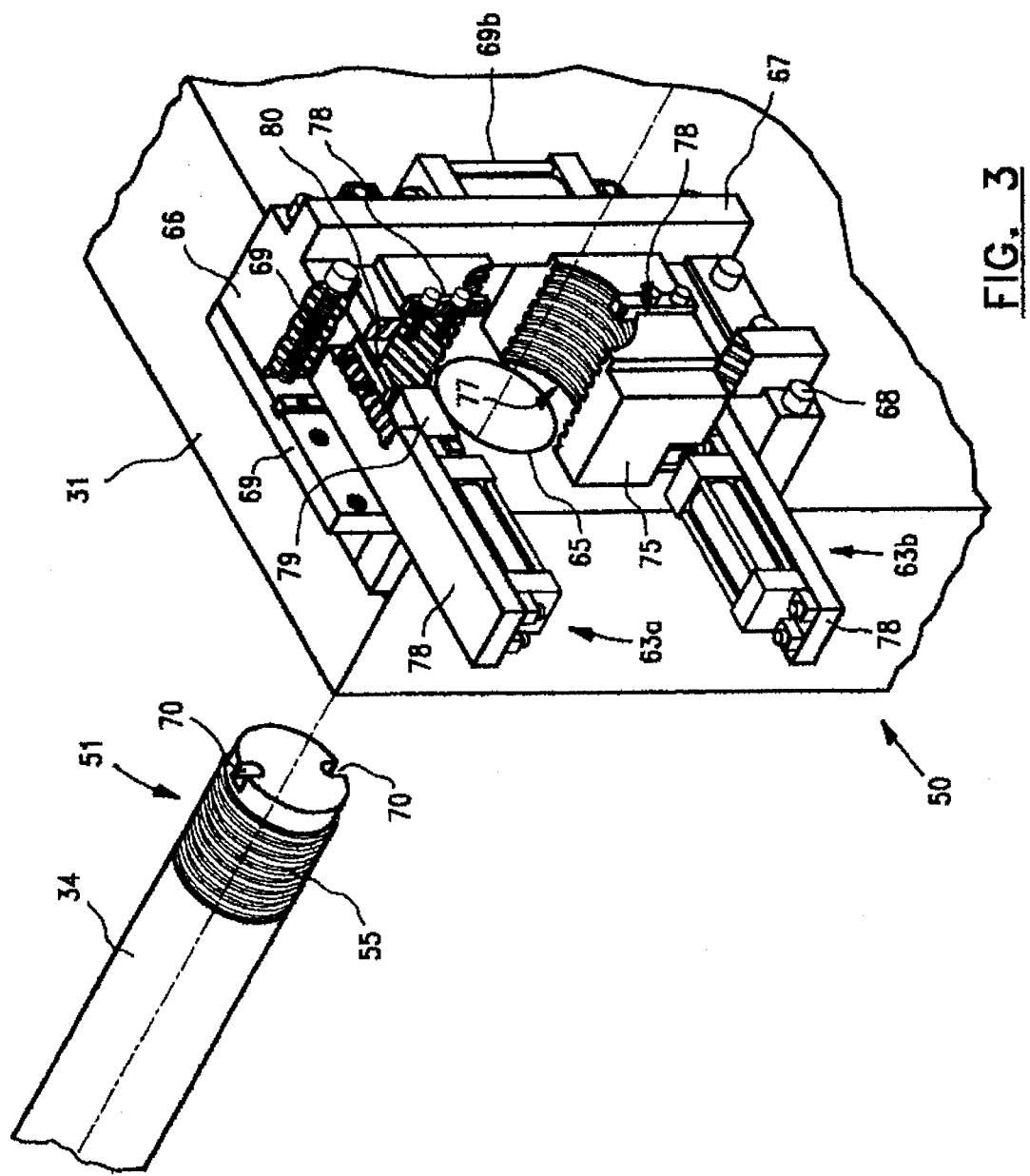

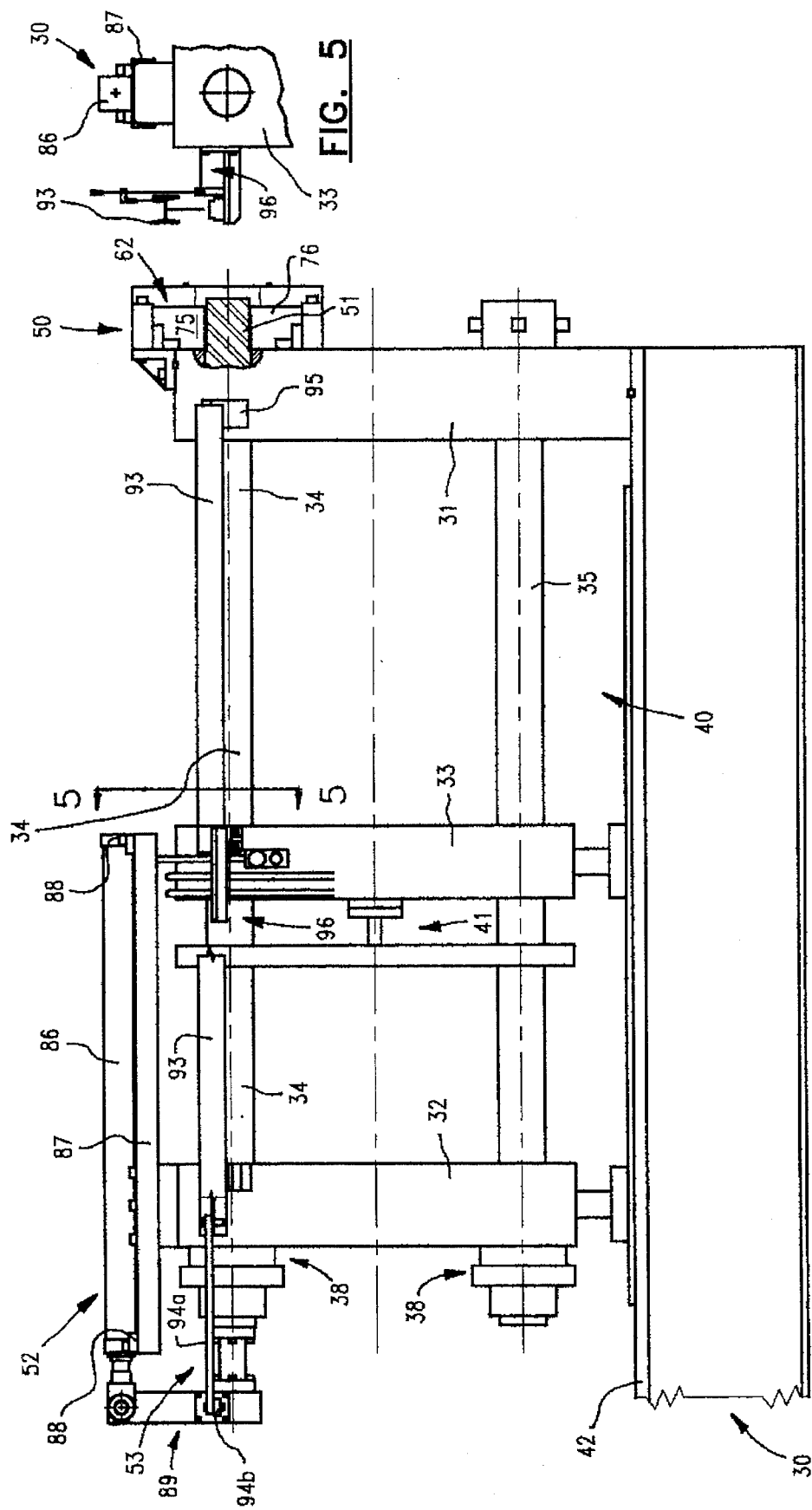

DIE SPACE ACCESS SYSTEM FOR TIE-BAR STYLE DIE-CASTING MACHINES

BACKGROUND OF THE INVENTION

1. Field of the Invention

This invention relates to Die-Casting Machines, and more particularly to Tie-Bar Style Die-Casting Machines. The invention provides a die-space access system for use with the tie-bar style die-casting machine. The system provides improved access to the die space of the machine for the removal and/or installation of dies.

2. Background Information

Die casting machines and die casting processes have been used for many years to produce metal castings for a variety of applications in a variety of industries, such as in the manufacture of automobile transmission housings and drive train components. Castings are produced by supplying molten metal, such as aluminum, magnesium and alloys thereof, under pressure to a die. A die is installed and positioned in a die casting machine, closed and locked. Subsequently, the molten metal is delivered to a cold or hot piston pump and driven though a feeding system to the cavities of the die. Pressure is applied for a predetermined time to allow the casting to solidify. The die is then opened and the casting is ejected. This process is typically repeated though multiple casting cycles until the die is removed for cleaning or replacement.

Tie-bar style die casting machines, which utilize tie-bar pullers to secure a die in the die space of the machine are well known in the art. A plurality of threaded tie bars permit opening and closing of the die halves between casting cycles. Existing tie-bar systems have significant limitations and shortcomings. Most significantly, they do not provide ease of access to the die space for installation and removal of dies therefrom. Ease of access to the die space allows for fast die changes and resultant efficient use of energy, manpower and material in die casting operations. Other problems exist with respect to adjustment of tie bar tension, and even and consistent closing of the die, for example. Prior art tie bar machines require frequent individual manual adjustment of the tie bars during operation. Such adjustments procedures also result in inefficiencies in operation.

U.S. Pat. No. 4,285,384 to Wunder discloses an apparatus and method for tie bar nut drive system. This apparatus and method are for removing tie bars from a die casting machine to permit removal and insertion of dies. The apparatus and method involve utilizing gearing attached to the tie bar nut whereby the nut is held captive, but is capable of being rotated by an auxiliary drive unit. The locking nut is rotated to a preselected position and locked.

Despite the need in the art for a die space access system for use with tie-bar style die casting machines, and which overcomes the shortcomings and limitations of the prior art, none insofar as is known has been developed or proposed. Accordingly, it is an object of the present invention to provide a die space access system for use with a tie bar style die casting machine which permits improved installation and removal of dies. Another object of this invention is to provide a die space access system which permits accurate and reproducible adjustment of tie bar tension. It is a further object of this invention to provide a die space access system which is reliable, durable, simple to manufacture and use, and which overcomes the general limitations and shortcomings of the prior art.

SUMMARY OF THE INVENTION

The apparatus of the present invention provides a die space access system for tie bar style die casting machines. The system provides improved access to the die space of the machine for installation and removal of dies. The system allows a tie bar to be horizontally withdrawn from its normal position to provide unobstructed access to the die space between the shot platen and moveable platen of the machine.

The system comprises a vertically moveable split clamp and a frame. The split clamp has a circular bore with grooves. The grooves mate with complementary grooves on the outside diameter of the tie bar. The frame is fastened to the outside surface of the shot platen and maintains the split clamp in proper position and also allows the clamp to vertically move. A pair of vertically mounted hydraulic cylinders move the split clamp. Retraction of the cylinders move the clamp into engagement with the tie bar. Extension of the cylinders releases the clamping fore of the clamp on the tie bar and allows the tie bar to be withdrawn through the shot platen. A pair of horizontally mounted hydraulic cylinders are connected to wedge member. The wedge members are moveable into contact with fixed inclined surfaces or ramp blocks. This structure provides a positive mechanical locking force against the two halves of the split claim to lock it on the tie bar. Retraction of the wedges via the cylinder frees the split clamp and allows it to vertically unlock the clamp and withdraw the tie bar.

The features, benefits and objects of this invention will become clear to those skilled in the art by reference to the following description, claims and drawings.

BRIEF DESCRIPTION OF THE DRAWINGS

FIG. 3 is a perspective view, partly exploded to show internal features, of the die space access system shown in FIG. 2.

FIG. 4 is a side view of a tie bar style die casting machine including the die space access system of the present invention.

FIG. 5 is an end view of a portion of the die casting machine, taken along line 5—5 of FIG. 4.

DESCRIPTION OF THE PREFERRED EMBODIMENTS

Figure 1:
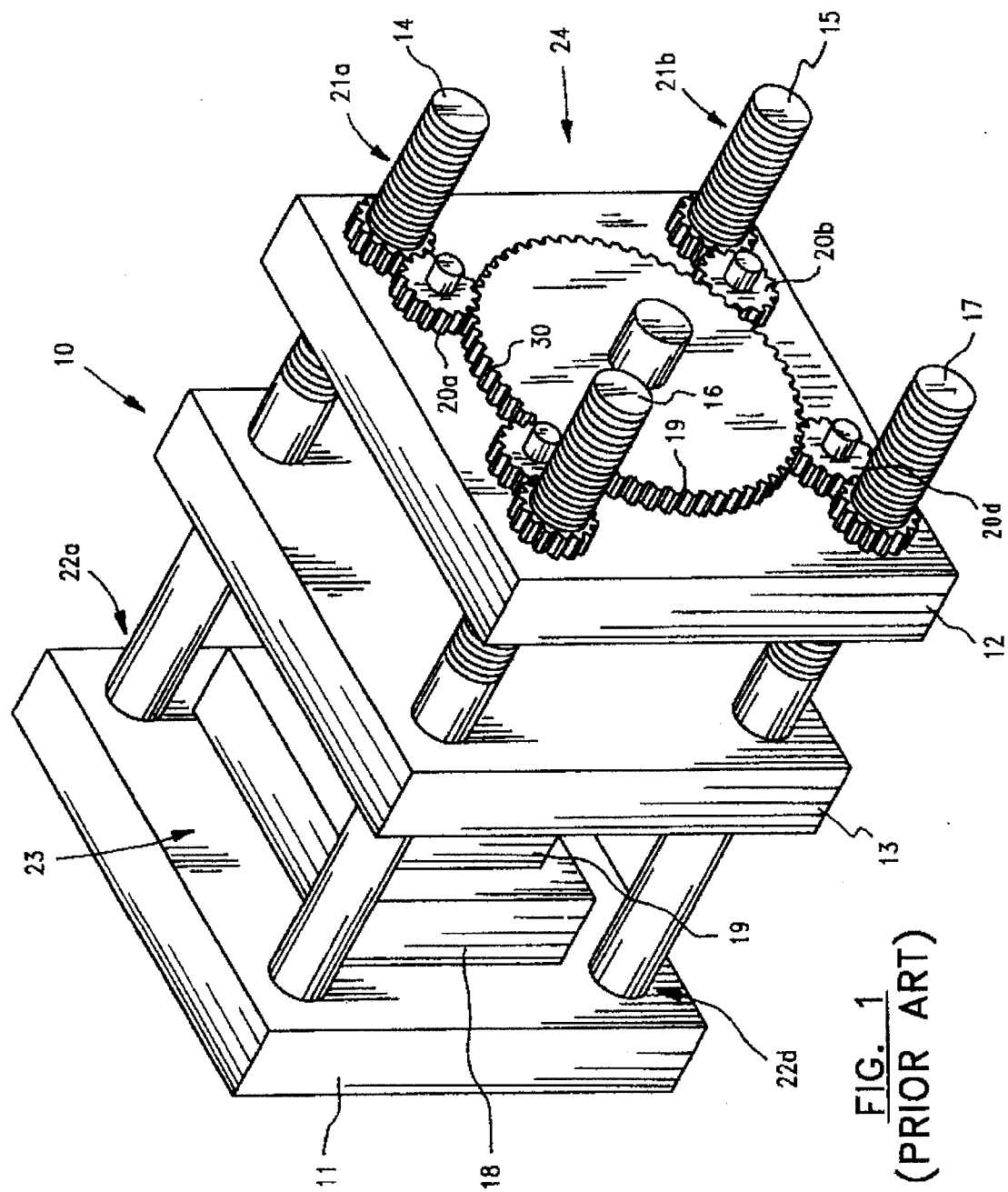
FIG. 1 is a perspective view of a prior art tie bar style die casting machine.

Referring to FIG. 1, existing die casting machines typically have a structure substantially similar to that of machine 10. The machine 10 includes a stationary front or shot platen or plate 11, a rear platen 12 and a movable platen 13. The movable platen 13 is disposed between the front and rear platens and is slidably mounted on four tie bars 14–17. The rear platen 12 is secured to the tie bars 14–17 via adjustment nuts 20a–d disposed on threaded second ends 21a–d of the tie bars 14–17. A gearing system 24 is used to square the platens 11–13 during initial set-up of the machine 10. Importantly, the tie bars 14–17 of the prior art machine 10 are set in an extended position through the movable platen 13 and the shot platen 11 and cannot be moved except for minor adjustments made to square the platens 11–13. The space 23 between the shot platen 11 and the movable platen 13 is referred to as the die space. A first half of a die 18 is attached to the rearward facing surface of the shot platen 11. The other half of the die 19 is attached to the forward face of the moveable platen 13. A hydraulic ram and toggle linkage (not shown) advances the movable platen 13 toward the shot platen 11 to a casting position and retracts the movable platen 13 from the shot platen 11 to open the die for removal of the cast part.

In the prior art machine 10, difficulties exist with respect installing and removing the die from the die space 23, particularly with large dies. The tie bars 14–17 of prior art machines 10 are fixed to the platens 11–13 and cannot be retracted and therefor obstruct the opening to the die space. The present invention overcomes the problem of limited access to the die space by providing a means of retracting one or more tie bars.

Figure 6:
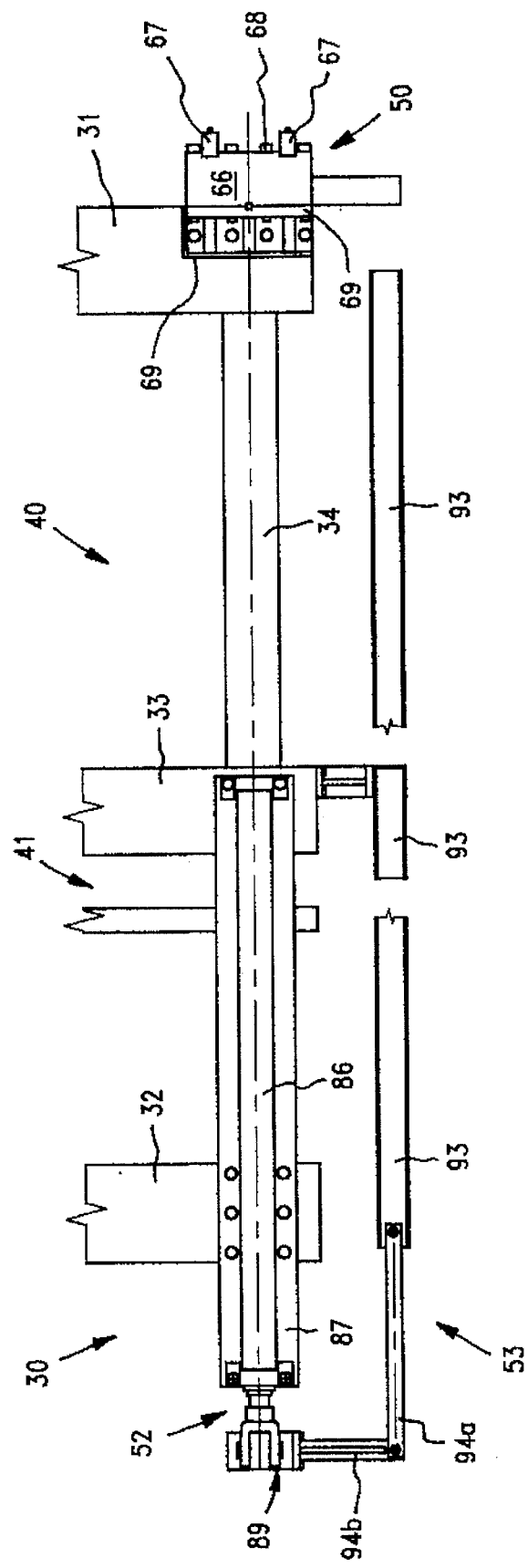
FIG. 6 is a top view of the die casting machine of FIG. 4.
Figure 7:
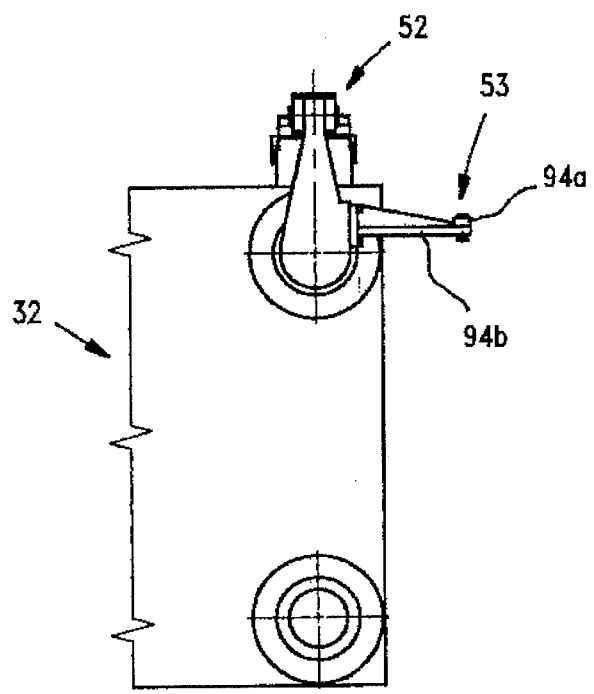
FIG. 7 is an end view of the die casting machine taken from the left side of FIG. 4.

Referring to FIGS. 4 and 6, a die casting machine 30 is shown having the die space access system (described in detail below) of the present invention. The machine shown is an 850 Ton B&T machine, although the system of this invention is useable on a variety of machines. The machine 30 includes a stationary shot platen 31, an adjustable rear platen 32, a movable platen 33 and a die space 40 disposed between shot platen 31 and the movable platen 33. These elements are mounted on a suitable frame 42. The movable platen 33 is disposed between the front and rear platens 31 and 32 and is slidably mounted on for tie bars (not all shown) 34–37. The rear platen 32 is secured to the rearward ends 38 of the tie bars 34–37. Tie bars 35, 36 and 37 are fixed to the shot platen 31. Importantly, the shot platen 31 of the die casting machine 30 of the present invention has a die space access system which allows the tie bar 34 to be horizontally moved with respect to the shot platen 31 and movable platen 33. As used herein, the term "rearward" shall pertain to the general direction of the rear platen 32 and "forward" shall pertain the general direction of the shot platen 31.

As is the case in the typical die casting machine, a first half of a die (not shown) is attached to the rearward facing surface of the shot platen 31. The second half of the die (not shown) is attached to the forward face of the moveable platen 33. A hydraulic ram and toggle linkage 41 advances the movable platen 33 toward the shot platen 31 to a casting position and retracts the movable platen 33 from the shot platen 31 to open the die for removal of the east part.

Referring again to FIG. 5, the die space access system of the present invention, shown utilized on the die casting machine 30, in its most basic form comprises a modified first tie bar 34, a clamp mechanism 50, a tie bar/safety door actuation mechanism 52, and a retractable safety door hanger assembly 53. These elements function to permit locking of the first tie bar 34 in position during casting and to permit horizontal withdrawal of the tie bar 34 for installation or removal of a die. Withdrawal of the tie bar yields a larger access area or window to the die space 40. The dimensions of the components of the die space access system are a function of the overall size and specific dimensions of the die casting machine with which the system is utilized.

Figure 2:
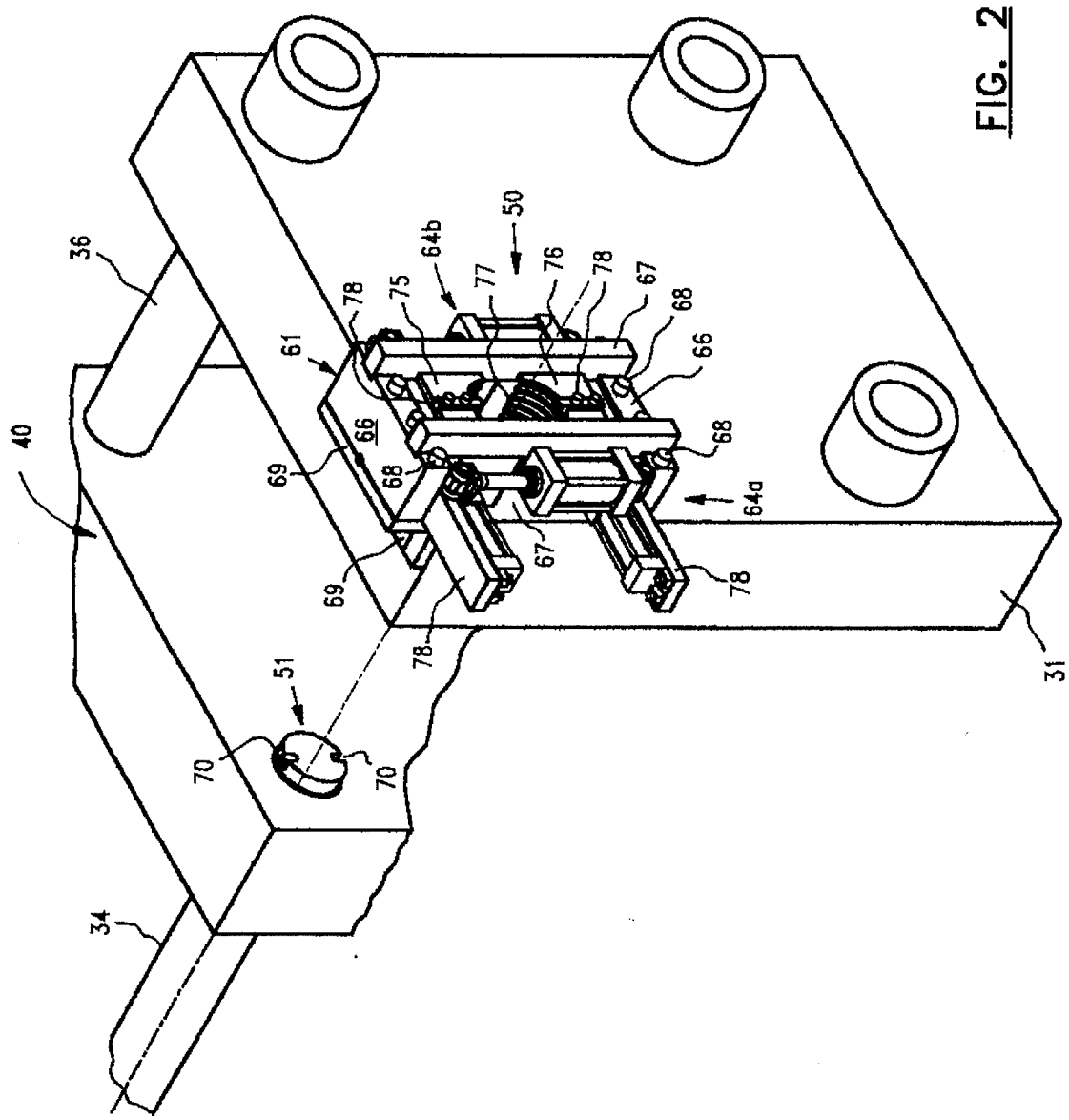
FIG. 2 is perspective view of the die space access system of the present invention, wherein the clamp mechanism is opened and the retractable tie bar is withdrawn.

Referring to FIGS. 2 and 3, a critical feature of the modified tie bar 34 is its forward end 51 which has a plurality of circumferential grooves 55. The grooves 55 mate with a series of complementary channels in the clamp mechanism 50, which mating enables strong locking of the tie bar 34 in place during casting. Preferably, the grooves 55 are disposed parallel to one another. The longitudinal field length of the grooves 55 is equivalent to the mating portion of the clamp 62. The terminal tip of end 51 of the tie bar 34 is free of grooves. A pair of vertically aligned top and bottom alignment notches 70 are disposed on the terminal end 51. The alignment notches 70 mate with complementary structures of the clamp 62 as discussed below. The opposite or rearward end 38 of the tie bar 34 is coupled to the tie bar actuator 52 as described further below.

Figure 8:
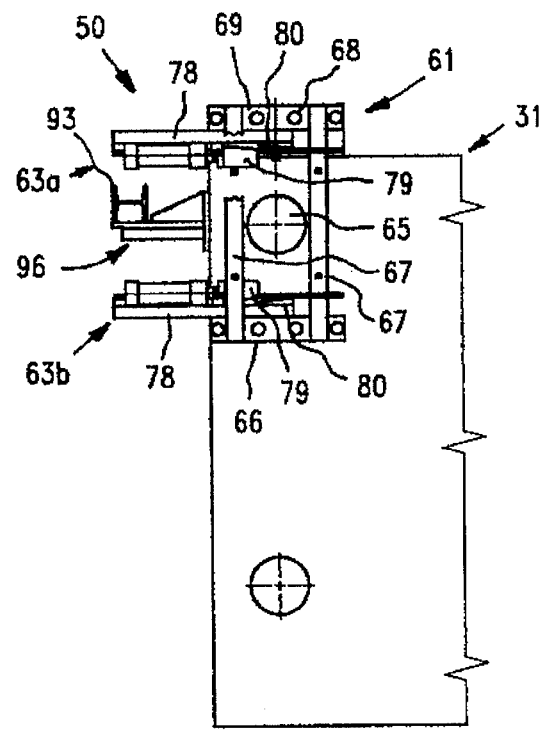
FIG. 8 is an end view of the die casting machine taken from the right side of FIG. 4.
Figure 11:
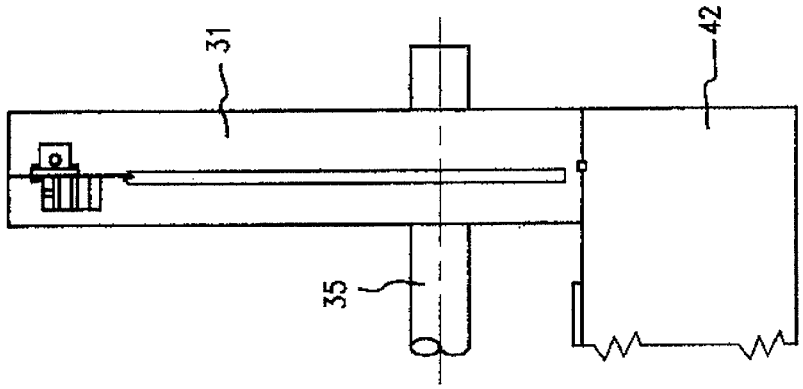
FIG. 11 is a partial end view of the shot platen showing the rail lock mechanism.
Figure 9:
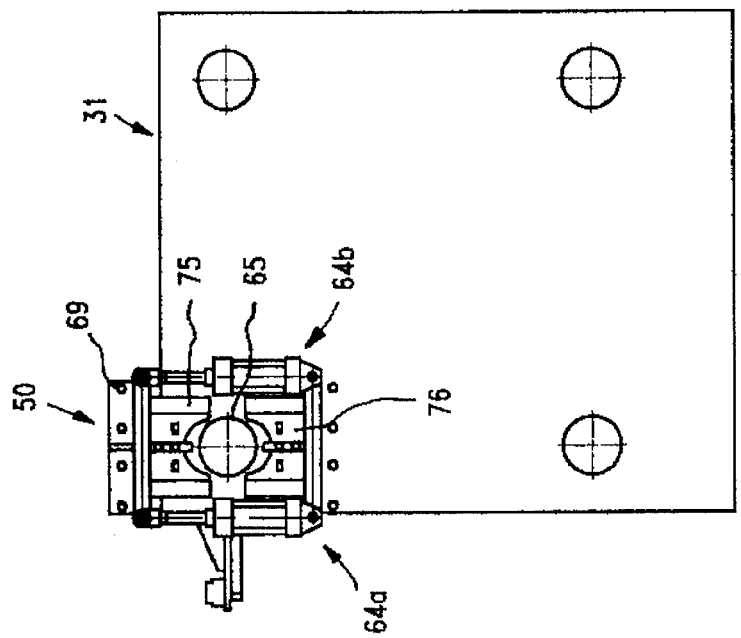
FIG. 9 is a front view of the shot platen of the die casting machine.
Figure 10:
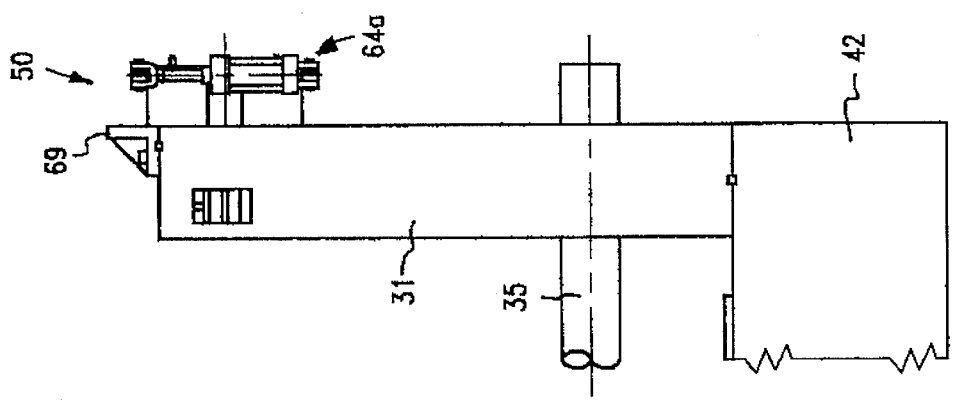
FIG. 10 is a partial end view of the shot platen.
Figure 12:
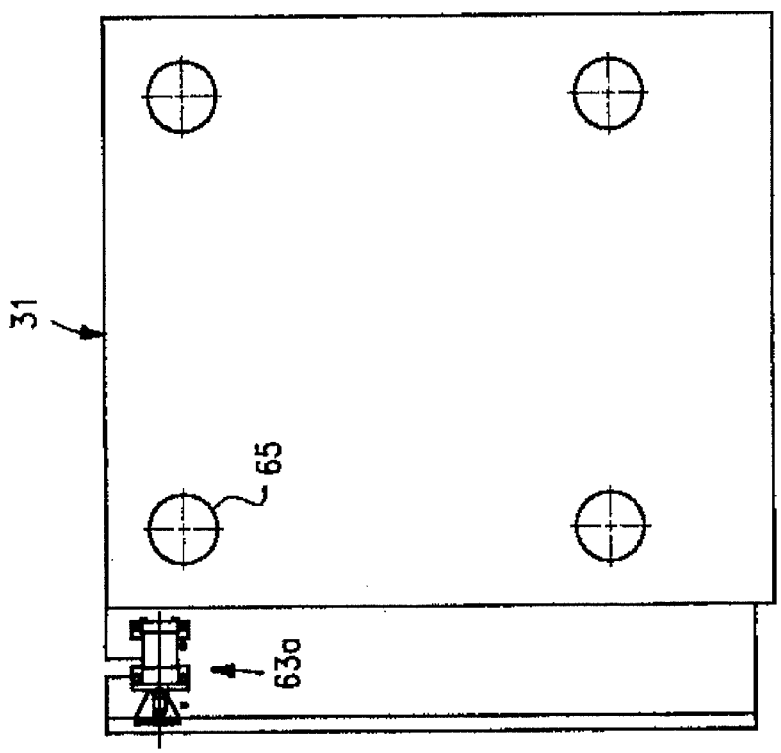
FIG. 12 is a front view of the shot platen showing the rail lock installation.
Figure 14:
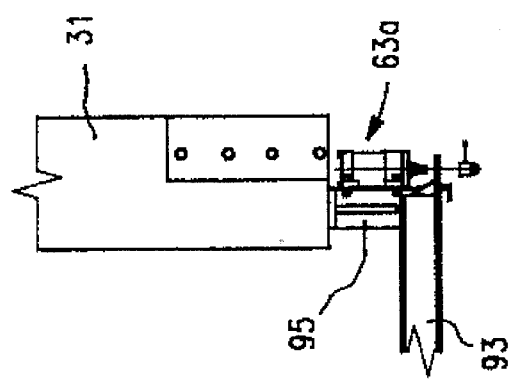
FIG. 14 is a partial top view of the shot platen shown in FIG. 11.
Figure 13:
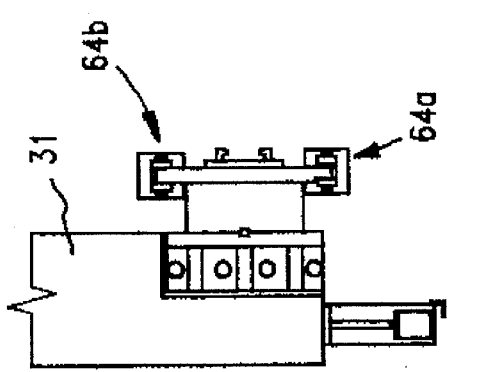
FIG. 13 is a partial top view of the shot platen shown in FIG. 10.

Referring also to FIG. 8, the clamp mechanism 50 basically comprises a frame 61, a split clamp 62, a pair of horizontally mounted clamp locking cylinders 63a and b with wedge ends and a pair of vertically mounted clamp actuation cylinders 64a and b.

The frame 61 is fastened to the outside or forward surface of the shot platen proximate tie bar aperture 65, through which tie bar 34 is extendible. The frame 61 is shown to include integrally formed, parallel, spaced top and bottom horizontal members 66 and side vertical members 67. The lower horizontal members 66 are shown to be connected to the platen 31 via bolts 68, directly at the bottom and via a bracket 69 at the top. The frame 61 provides a base structure which maintains the clamp 62 in an operative position, even under an axial or longitudinal force exerted by the tie bar during a casting cycle, and further permits the clamp 62 to move properly during horizontal retraction or extension of the tie bar between casting cycles.

The split clamp 62 comprises a pair of top and bottom clamp halves 75 and 76 which are retained in a vertically movable position proximate the platen bore 65 via the frame 61. Each clamp half 75 and 76 is a metallic, rectilinear structure and has a semicircular bore 77 of a configuration which is complementary to that of the tie bar end 51, such that the end 51 is retainable within the closed clamp 62. The bore 77 of each clamp half 75 and 76 is oriented proximate and axially with respect to the platen aperture 65. The bore has a plurality of parallel grooves. The grooves are complementary to those on the tie bar 34 end 51 and importantly are angled so as to longitudinally pull the coupled tie bar end 51 into proper position upon clamping and correct for minor offset errors of in positioning the inserted tie bar 34. This structure permits correction of offset errors of approximately 0.5–1.0 degrees of rotation to yield tie bar positioning to within approximately 0.001 inch of the desired location. An anti-rotating stop member 78 is also disposed centrally at the outward end of each bore 77 for mating with the key slot 70 on the tie bar end 51. The dimensions of each clamp half 75 and 76 are such that the clamp half 75 or 76 is vertically moveable, but horizontally restrained, within the frame from a clamping position substantially aligned with the platen aperture 65 to a release position spaced from the aperture 65 circumference. Inclined ramp surfaces 80 firmly lock the clamp halves 75 and 76 in a fixed position as discussed further below.

The vertically mounted clamp actuation cylinders 64a and b are preferably hydraulic cylinders with a 3.25 inch bore and a 5 inch stroke manufactured for example by Sheffer. Each cylinder 64a and b is fixed at a bottom end to the frame 61. The top end of the extendible piston of each cylinder 64a and b is connected to the top clamp half 75. Extension of the cylinder 64a and b pistons raises the clamp half 75 and frees the tie bar 34 for movement. Retraction of the cylinder 64a and b pistons lowers the clamp half 75 into a tie bar engaging position.

The horizontally mounted clamp locking cylinders 66a and b are preferably hydraulic cylinders with a 3.25 inch bore and a 2 inch stroke manufactured for example by Sheffer. Each cylinder 66a and b is fixed at a outwardly extending end to the frame 61 via a keying plate 78. The inclined surfaces 80 are disposed on the inwardly disposed end at the bottom of each keying plate 78'. The inwardly disposed end of the extendible piston of each cylinder 66a and b is connected to a wedge end 79. Extension of the cylinder 66a and b pistons moves the wedge ends 79 into contact with the ramp surfaces 80, which positively mechanically locks the clamp halves 75 and 76 into a clamping position. Retraction of the cylinder 66a and b pistons disengages the wedge ends 79 from the ramp surfaces 80 and unlocks the split clamp halves 75 and 76 so that they may be vertically moved by the vertical cylinders 64a and b.

The tie bar/safety door actuation mechanism 52 comprises an actuation cylinder 86, a mounting frame 87 and connectors 88 and a linkage assembly 89. The actuation cylinder is preferably a hydraulic cylinder with a 4 inch bore and a 72 inch stroke. The cylinder is disposed longitudinally above the tie bar 34 and mounted to the frame 87 at each of its ends via the connectors 88. The piston of the cylinder 86 is extendible rearwardly and is connected to the rearward end 38 of the tie bar 34 via the linkage assembly 89. Extension of the cylinder 86 piston horizontally retracts the tie bar 34 from its normally closed position. Retraction is accomplished subsequent release of the forward end 51 of the tie bar 34 by the clamp mechanism 50 as discussed above.

Virtually all die casting machines include a safety door, guard or screen system to protect the operator and other personnel from accidental contact with certain elements of the die casting machine during its operation. The retractable safety door hanger assembly 53 of the present apparatus 30 serves as a mounting track for safety door(s) (not shown). The assembly is horizontally, rearwardly retractable along with the first tie bar 34. Hence, as the tie bar 34 is retracted to provide access to the die space 40, the safety doors are also retracted so as not to impede access. The assembly 53 comprises a door track 93, first and second rear connection members 94a and b, a first guide assembly member 95, and a second guide assembly 96. The door track 93 is an elongated metal track structure with an upwardly disposed longitudinal slot for supporting the safety doors (not shown). The track 93 is shown to be horizontally disposed parallel to and at approximately the same height as the first tie bar 34. The door track 93 is connected at its rearward end to the actuator linkage assembly 89 via the first and second rear connection members 94a and b. The forward end of the door track 93 is slidably supported in its extended position to the shot platen 31 via the first guide assembly 95. The second guide assembly 96 is mounted on the side of the movable platen 33, near the top end thereof. The second guide assembly slidably supports and guides the track 93 throughout its range of extension and retraction. The track 93 is extended and retracted coextensively with the first tie bar 34 via the actuator 52.

The function of the apparatus 30 will now be described with reference to FIGS. 2–6. The tie bar 34 is normally locked in position, along with the remaining tie bars 35–37, for casting. The procedure for retracting the tie bar 34 and providing an access window to the die space, for example for changing the die, is as follows. First, the horizontal clamp locking cylinders 63a and b are operated to retract the wedge ends 79 from contact with the ramp surfaces 80 and clamp halves 75 and 76. Secondly, the vertical clamp actuation cylinders 64a and b are operated to retract their respective pistons and vertically move the now unlocked clamp halves 75 and 76 away the tie bare 34 end 51. With the clamping force on the tie bare 34 end 51 removed, the tie bare 34 may now be horizontally retracted. Thirdly, the tie bar actuation cylinder 86 is operated to extend its piston and thereby horizontally rearwardly retract the tie bar 34. This retracts the tie bar 34 connective end 51 from the clamp 50, through the shot platen aperture 65 and away from the die space 40. The access window to the die space 40 is thereby increased in size. Upon completion of the operation in the die space, such as die change over, the tie bar 34 is returned to its normal position by reversal of the foregoing method steps.

As many changes are possible to the embodiments of this invention utilizing the teachings thereof, the descriptions above, and the accompanying drawings should be interpreted in the illustrative and not the limited sense.

The invention claimed is:

1. A die casting machine, comprising:
  (a) a shot platen, a movable platen, a die space disposed between said shot and movable platens, an adjustable rear platen, and three fixed position tie bars coupled to the platens;
  (b) at least one tie bar slidably mounted through said platens, said slidable tie bar having a connection end, said slidable tie bar being horizontally extendable during a casting procedure and horizontally retractable to provide an access window to the die space;
  (c) means to releasably clamp said connection end in a fixed location, said means to clamp being attached to one platen of the tie bar machine; and
  (d) means to move said slidable tie bar.

2. The system of claim 1, wherein said means to move said slidable tie bar is an actuator mounted on the die casting machine and connected to said slidable tie bar, said actuator horizontally moving said slidable tie bar upon release by said means to releasably clamp to create and close an access window to the die space.

3. The system of claim 2, wherein said actuator comprises an actuatable cylinder fixed in position to the rear and movable platens and having an extendable cylinder connected to said slidable tie bar via linkage means.

4. The system of claim 1, wherein said die casting machine further has a safety door and wherein the system further comprises a retractable safety door frame.

5. The system of claim 4, wherein said safety door frame comprises an elongated door track, means to connect said door track to said means to move said slidable tie bar and at least one guide fixed in position on the die casting machine.

6. The system of claim 1, wherein said means to releasably clamp is disposed on the shot platen of the tie bar machine and comprises a frame attached to the shot platen, a pair of clamp halves, means to lock said clamp halves in a fixed position and means to actuate said clamp halves.

7. The system of claim 6, wherein said frame has a pair of horizontal members fixed to the shot platen and a pair of vertical members connected to said horizontal members and spaced from the shot platen, said clamp halves being movably disposed in a space created between the shot platen and said vertical members.

8. The system of claim 6, wherein said means to lock said clamp halves comprises at least one actuatable cylinder having an angled contact end and an angled ramp surface disposed to wedge said contact end against each said clamp halve.

9. The system of claim 6, wherein said clamp halves are retained by said frame, each clamp half having a curved bore axially aligned with a tie bar aperture on the shot platen through which said connection end of said slidable tie bar is operatively extended for a casting procedure, said curved bore having a plurality of circumferentially disposed, transaxial locking grooves, and wherein said connection end has a plurality of complementary locking grooves for clamped mating connection with clamp half locking grooves in said operative extended position.

10. The system of claim 9, wherein said grooves of said tie bar connection end and said clamp halves are angled.

11. The system of claim 6, wherein said means to actuate said clamp halves comprises at least one actuatable cylinder connected to at least one said clamp half.

12. The system of claim 11, wherein there are two cylinder connected to an upper clamp half, whereby said upper clamp half is brought downwardly to engage said tie bar.

13. A tie bar style die casting machine, comprising:
   (a) a shot platen;
   (b) a movable platen spaced apart from said shot platen and forming a die space therebetween;
   (c) an adjustable rear platen spaced apart from said movable platen;
   (d) three fixed position tie bars coupled to said platens; and
   (e) a die space access system including:
      (i) a tie bar slidably mounted through platens of the die casting machine, said slidable tie bar having a grooved connection end;
      (ii) a clamp mechanism for releasably holding said connection end of said slidable tie bar in a fixed location, said clamp mechanism being disposed on the shot platen of the tie bar machine, said clamp mechanism including a frame attached to the shot platen, a pair of clamp halves, means to lock said clamp halves in a fixed position and means to actuate said clamp halves; and
      (ii) an actuator mounted on the die casting machine and connected to said slidable tie bar, said actuator horizontally moving said slidable tie bar upon release by said clamp mechanism to create and close an access window to a die space located between the shot platen and the movable platen.

14. A die casting machine of the type having a shot platen, a movable platen and an adjustable rear platen, and three fixed position tie bars coupled to the platens, wherein the improvement comprises a die space access system including:
   (a) a tie bar slidably mounted through the platens of the die casting machine, said slidable tie bar having a grooved connection end;
   (b) a clamp mechanism for releasably holding said connection end of said slidable tie bar in a fixed location, said clamp mechanism being disposed on the shot platen of the tie bar machine, said clamp mechanism including a frame attached to the shot platen, a pair of clamp halves having a curved bore axially aligned with a tie bar aperture on the shot platen through which said connection end of said slidable tie bar is operatively extended for a casting procedure, said curved bore having a plurality of circumferentially disposed, transaxial locking grooves for clamped mating connection with said tie bar connection end, a pair of cylinders having wedge shaped ends for locking said clamp halves in a fixed position and a pair of cylinders for actuating said clamp halves; and
   (c) an actuator mounted on the die casting machine and connected to said slidable tie bar, said actuator horizontally moving said slidable tie bar upon release by said clamp mechanism to create and close an access window to a die space located between the shot platen and the movable platen.

* * * * *